United States Patent [19]

Lackey et al.

[11] Patent Number: 4,509,116
[45] Date of Patent: Apr. 2, 1985

[54] SPECIAL INSTRUCTION PROCESSING UNIT FOR DATA PROCESSING SYSTEM

[75] Inventors: Stanley A. Lackey, Littleton; Kim A. Meinerth, North Andover; David A. Stoner, Tewksbury, all of Mass.

[73] Assignee: Digital Equipment Corporation, Maynard, Mass.

[21] Appl. No.: 370,390

[22] Filed: Apr. 21, 1982

[51] Int. Cl.³ .............................................. G06F 15/16
[52] U.S. Cl. ..................................................... 364/200
[58] Field of Search ... 364/200 MS File, 900 MS File, 364/748

[56] References Cited

U.S. PATENT DOCUMENTS

| 4,179,734 | 12/1979 | O'Leary | 364/200 |
| 4,208,722 | 6/1980 | Rasala et al. | 364/760 |
| 4,229,801 | 10/1980 | Whipple | 364/748 |
| 4,270,167 | 5/1981 | Koehler et al. | 364/200 |
| 4,338,675 | 7/1982 | Palmer et al. | 364/748 |
| 4,395,758 | 7/1983 | Helenius et al. | 364/200 |

Primary Examiner—Raulfe B. Zache
Attorney, Agent, or Firm—Cesari and McKenna

[57] ABSTRACT

A special instruction processor, such as a floating point accelerator processor, that processes a special class of instructions. Each instruction identifies the number of operands to be processed as well as the number of data words required to be transferred for each operand. The central processing unit retrieves and decodes each instruction, and transfers the special instructions to the special instruction processor. Both processors decode the special instructions to determine the numbers of operands and data words to be transferred. The central processing unit retrieves the data words from memory and transmits them to the special instruction processor. The special instruction processor processes the instruction and signals the central processor when finished. The central processor then causes the special instruction processor to transmit the processed data back to the central instruction processor.

7 Claims, 6 Drawing Figures

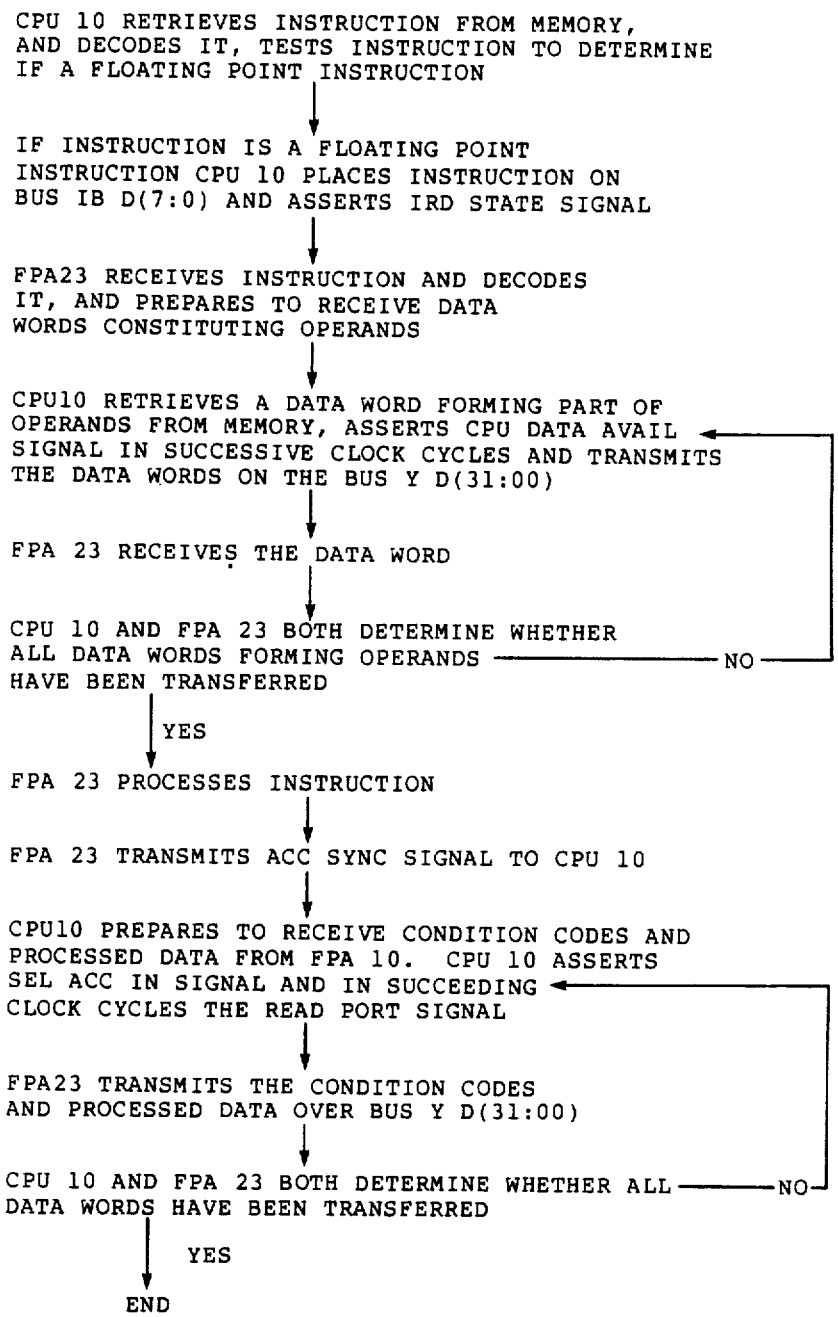

SPECIAL INSTRUCTION PROCESSING UNIT FOR DATA PROCESSING SYSTEM

BACKGROUND OF THE INVENTION

1. Field of the Invention

This invention relates to electronic digital data processing systems incorporating a special instruction processor such as a floating point accelerator processor. More specifically, the invention relates to a new and improved interconnection arrangement between a floating point processor and a central processor unit.

2. Description of the Prior Art

A digital data processing system comprises three elements: namely, a memory element, an input/output element, and a processor element. The memory element stores information in addressable storage locations, with each location having a unique address. The information stored in the memory includes data, or "operands", and instructions for processing the operands. The processor element transfers information to and from the memory element, interprets the information as either instructions or operands and processes the operands in accordance with the associated instructions. The input/output element, under control of the processor unit, also communicates with the memory element in order to transfer operands and instructions into the system and obtain processed data from it.

Operands processed by a processing unit may take a number of forms. In many processing operations, operands are in the form of integers or whole numbers. In other operations, operands are in a floating point format, that is, in what is typically known as "scientific notation". In this form, an operand has two parts, including an exponent and a mantissa. In a binary-based system used in most computers, the mantissa is a fraction with a binary point to the immediate left of the most significant digit, and the exponent represents the power of two to which the mantissa must be taken to obtain the value of the number. Each of the mantissa and the exponent may contain a sign, either positive or negative.

Similarly, operands for trigonometric functions may have a different form from both integer and floating point operands. For instance, some trigonometric functions may be repetitive for each multiple of three hundred and sixty degrees, if the operands are expressed in degrees, or may represent or require specific operations with respect to "pi" if the operands are expressed in radian notation. In addition to the scientific notation or special trigonometric function, other special operand notations are conceivable.

Each of these special classes of operands may require special handling by the processor. With respect particularly to floating point instructions, a number of arrangements for processing such operands have been attempted in the prior art. In some data processing systems, the central processing unit contains special control circuitry for executing the special instructions. Even with this hardware approach, floating point instructions usually require significantly more time to complete than do instructions on conventional integer operands. As a central processor unit executes all instructions, including the floating point instructions in seriatum, the execution of floating point instructions by the central processor can significantly increase the overall time to complete a given program.

In another approach, the operands are processed using subroutines comprising sets of the machine instructions to implement the floating point functions. The central processor unit merely uses a floating point instruction as an instruction directing the processor to execute the appropriate subroutine. This approach enables the functions performed by the special class of instructions to be altered relatively simply. However, this approach is considerably slower than the hardware approach, as the mantissas and exponents of the operands must be handled separately.

In other prior data processing systems, separate functional modules operating in parallel execute the instructions of the data processing system. In some cases, each module can execute all of the instructions on the different classes of operands, or specific modules may be assigned to process instructions on selected classes of operands. In either case, each module operates independently by retrieving data from or storing data in the memory unit directly. A controlling module may retrieve the instructions in seriatum and transfer it to either an idle module, or to the module designed to execute the instruction on the specified class of operand.

Since the modules operate in parallel, they may operate simultaneously, within the constraint that normally one instruction cannot be executed until a previous instruction has been executed. While the time required to perform a single operation is about the same as in the prior hardware approach, the parallel nature of the modules significantly reduces the time to execute a program contained in the special instructions, as a free central processor unit module may be used to process interrupts. However, as each module must be capable of operating independently, circuit redundancy is necessary. Each module usually performs only one function, and is not readily converted into other functions.

In a fourth arrangement, used on conjunction with certain PDP-11 data processing systems, a separate module, termed a "floating point accelerator", processes instructions in conjunction with floating point operands. The instruction indicates whether the operand is floating point or integer, and if the instruction indicates that the operand is floating point, the central processor unit passes the instruction to the floating point accelerator. The floating point accelerator then decodes the instruction, and requests the central processing unit to retrieve operands from the memory unit for memory, and to store the processed data in the memory. While this approach allows the central processing unit the freedom to process such things as interrupts while the floating point accelerator is in the process of executing the floating point instruction, the required interaction between the central processing unit and the floating point accelerator unnecessarily complicates both units.

It is therefore an object of this invention to provide a new and improved floating point accelerator.

It is yet another object of this invention to provide a new interconnection arrangement between the floating point accelerator and the central processing unit.

SUMMARY

In brief, this invention provides a new and improved interconnection arrangement between the central processing unit and a processing module for processing a special class of instructions that operate on a uniquely defined class of operands. The central processing unit retrieves all of the instructions, in series, in a conventional manner, and decodes the instructions. An image of each instruction is passed to the special instruction processor. When an instruction is received which requires processing of one of the special class of operands, the central processing unit then retrieves the data words comprising the operands from the memory and passes them to the special instruction processor.

After receiving the instruction the special instruction processor also decodes the instruction and proceeds to receive the data words comprising the operands. The special instruction processor then processes the operands in a conventional manner, and prepares to transmit the results of processing, namely the processed data and the condition codes, back to the central processing unit. When the central processing unit is signalled by the special instruction processor that it has finished processing, it signals the special instruction processor to transmit the data. The special instruction processor then transmits the data and the condition codes. The central processing unit then can transmit the processed data back into storage in the memory.

In addition, the invention provides certain maintenance and diagnostic features in which the central processing unit can force the special instruction processor to a selected state, and it can also determine the state of the special instruction processor.

BRIEF DESCRIPTION OF THE DRAWINGS

This invention is pointed out with particularity in the appended claims. The above and further objects and advantages of this invention may be better understood by referring to the following description taken in conjunction with the accompanying drawings in which:

FIG. 5 is a flow diagram depicting transfers between the central processing unit and special instruction processing unit shown in FIG. 1, and as described in conjunction with FIGS. 5 through 5a.

DESCRIPTION OF AN ILLUSTRATIVE EMBODIMENT

I. General Description

A. Data Processing System

Figure 1:
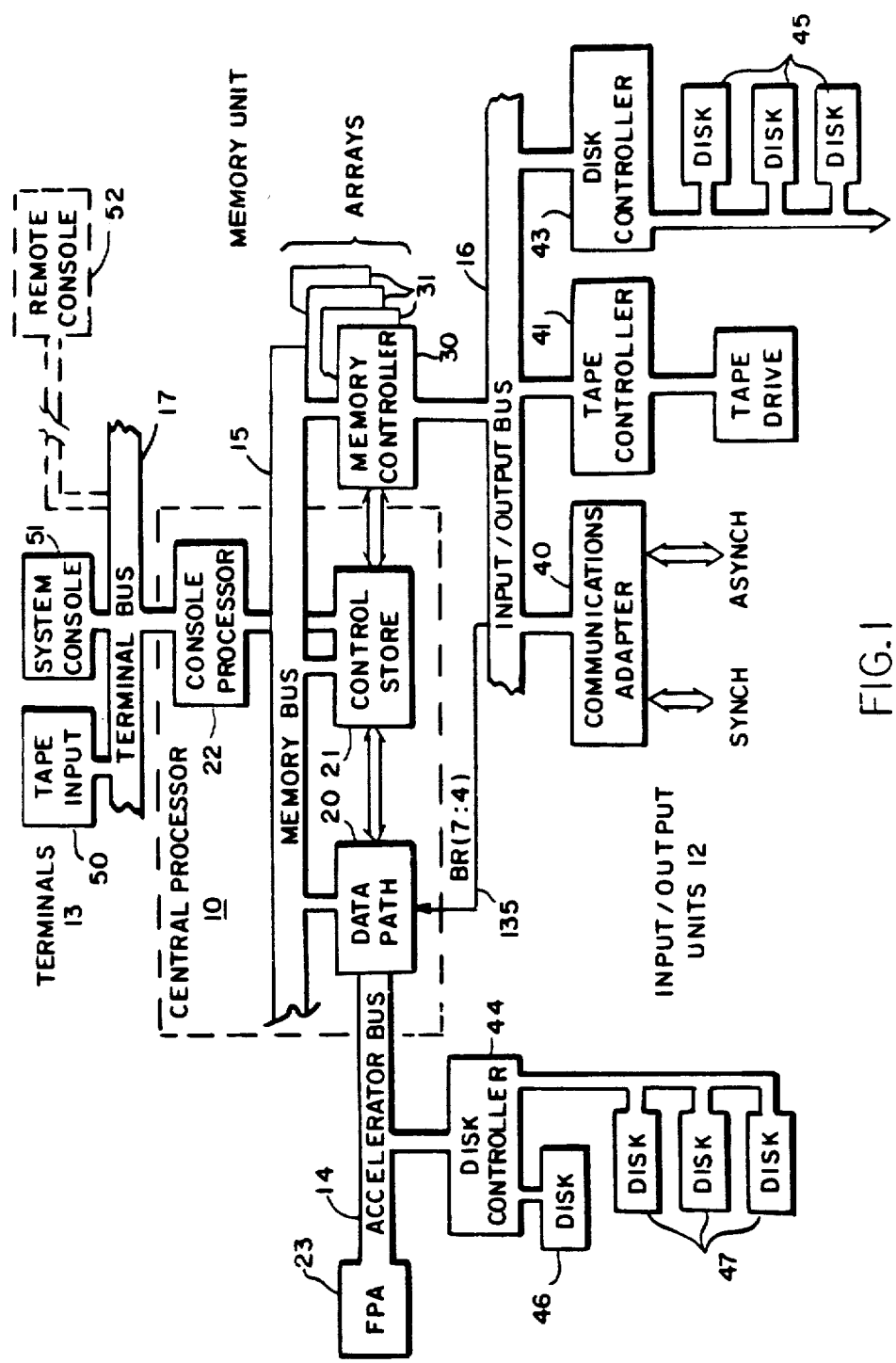
FIG. 1 is a block diagram of a digital data processing system constructed in accordance with this invention.

Referring to FIG. 1, the basic elements of a data processing system that embody this invention comprise a central processor unit 10, memory unit 11, and input/output units 12, which include terminals 13. The central processor unit communicates directly with certain of the input/output units 12 over an accelerator bus 14. The central processor unit 10 communicates with memory unit 11 over a memory bus 15, and the memory unit in turn communicates directly with others of input/output units 12 over an input/output bus 16. The central processor unit 10 communicates with terminals 13 over a terminal bus 17.

The central processor unit comprises a data processor 20, and control store 21 which are connected to memory bus 15, and a console processor 22. The console processor receives signals from terminal bus 17, and transfers them through control store 21 to data processor 20. Data processor 20 then operates on the information from console processor 22 and may transfer the information to the memory unit 11 for future processing, or it may process information directly. Similarly, data processor 20 may transfer information through control store 21 to the console processor 22, which may then transmit the information to terminal bus 17 for transfer to one of terminals 13. The data processor also performs all communications over the accelerator bus 14 with those input/output units 12 connected thereto. The communications with input/output units 12 over accelerator bus 14 are described in copending U.S. patent application Ser. No. 370,506, filed Apr. 21, 1982.

As described below, the data processor communicates directly with the memory unit 11 over memory bus 15, and indirectly with the input/output bus 16 through memory unit 11.

The control store 21 contains all of the microinstruction sequences that are used for processing the instructions that are received and executed by data processor 20, and steps through the microinstruction sequences based on sequencing information from the data processor and timing information from a timing signal generator which it maintains.

Memory unit 11 contains a memory controller 30 having one connection, or port, to memory bus 15, and a second connection to input/output bus 16. One or more memory arrays 31 connect to memory controller 30 and contain the addressable memory storage locations that may be accessed directly by the memory controller.

In addition to central processor unit 10, a floating point accelerator processor 23 may be connected to accelerator bus 14. A floating point accelerator processor 23 useful in the data processing system of FIG. 1, and the accelerator bus 14 are described herein. Floating point accelerator processor 23 receives floating point instructions from data processor 20 and is specially designed to process such instructions generally more rapidly than data processor 20 would normally be able to.

Several types of input/output units 12 are shown in FIG. 1. A communications adapter 40 can connect to synchronous and/or asynchronous data communications lines to transfer information over, for example, conventional telephone lines, or to enable connection of the data processing system as one element in a local distributed processing network. Specific signals for the synchronous and asynchronous communications with communications adapter 40 are not shown; however, such signals would depend on the particular signal protocols used in such transmission, and are not a part of this invention. The communications adapter 40 normally would include circuitry for buffering information during the synchronous or asynchronous transfers, and for generating control signals over the synchronous and asynchronous communications paths to enable the information to be transferred. The communications adapter 40 also contains circuitry for transferring information over input/output bus 16. Since the communications adapter forms no part of this invention, it will not be described further herein.

Three other input/output units 12 provide a secondary storage facility for the data processing system. They include a tape controller 41 connected to a tape drive 42, and two disc controllers 43 and 44. Disc controller 43 is connected to a plurality of disc drives 45, while disc controller 44 may be connected to a disc drive 46 and to a plurality of disc drives 47. Disc controller 44 is connected to accelerator bus 14, and is described in the aforementioned copending U.S. patent application Ser. No. 370,506, filed Apr. 21, 1982. Units 41 and 43, and their respective storage elements may be constructed as described in U.S. Pat. No. 3,999,163.

Terminals 13 may include a tape drive 50, or a system console 51, which are directly connected to terminal bus 17. An optional remote console 52 may be provided to transfer signals with terminal bus 17 over telephone lines through conventional modems (not shown). The remote console 52 can be used for remote diagnosis of system failures or for remote maintenance. The tape drive 50 may be used for local maintenance or for transferring information into or out of the system. The system console may be used to provide direct operator control of the system, and may permit the operator to turn the system on or off, to initialize the system, and to step through a program sequence step-by-step.

Before proceeding further, it may be useful to establish some definitions for terms that have already been used and will be used throughout the remainder of this description.

"Information" is intelligence that controls and provides the basis for data processing. It includes address, data, control and status information.

"Data" includes information which is the object of or result of processing.

"Address" information identifies a particular storage location in which other information, such as data information, control or status information or other address information, is stored.

"Control" information identifies particular operations to be performed. It includes commands between units of a data processing system that certain operations be performed, instructions to be performed by the central processor 10 or floating point accelerator processor 23, and it also includes information that modifies a unit's performance of an operation or execution of an instruction so as to enable certain actions to occur or disable actions from occurring.

An "instruction" is a step in a program that is executed by the central processor unit 10 or floating point accelerator processor 23. Each step may be executed by the respective processor executing one or more microinstructions. Each microinstruction is stored in a specific location, which is identified as a micro-address. Other units, for example, memory controller 30, also perform operations in response to and as defined in sequences of microinstructions.

"Status" information identifies the condition of various signals generated by a unit at various times during the processing of an operation or execution of an instruction.

B. Central Processor Unit 10

Figure 2:
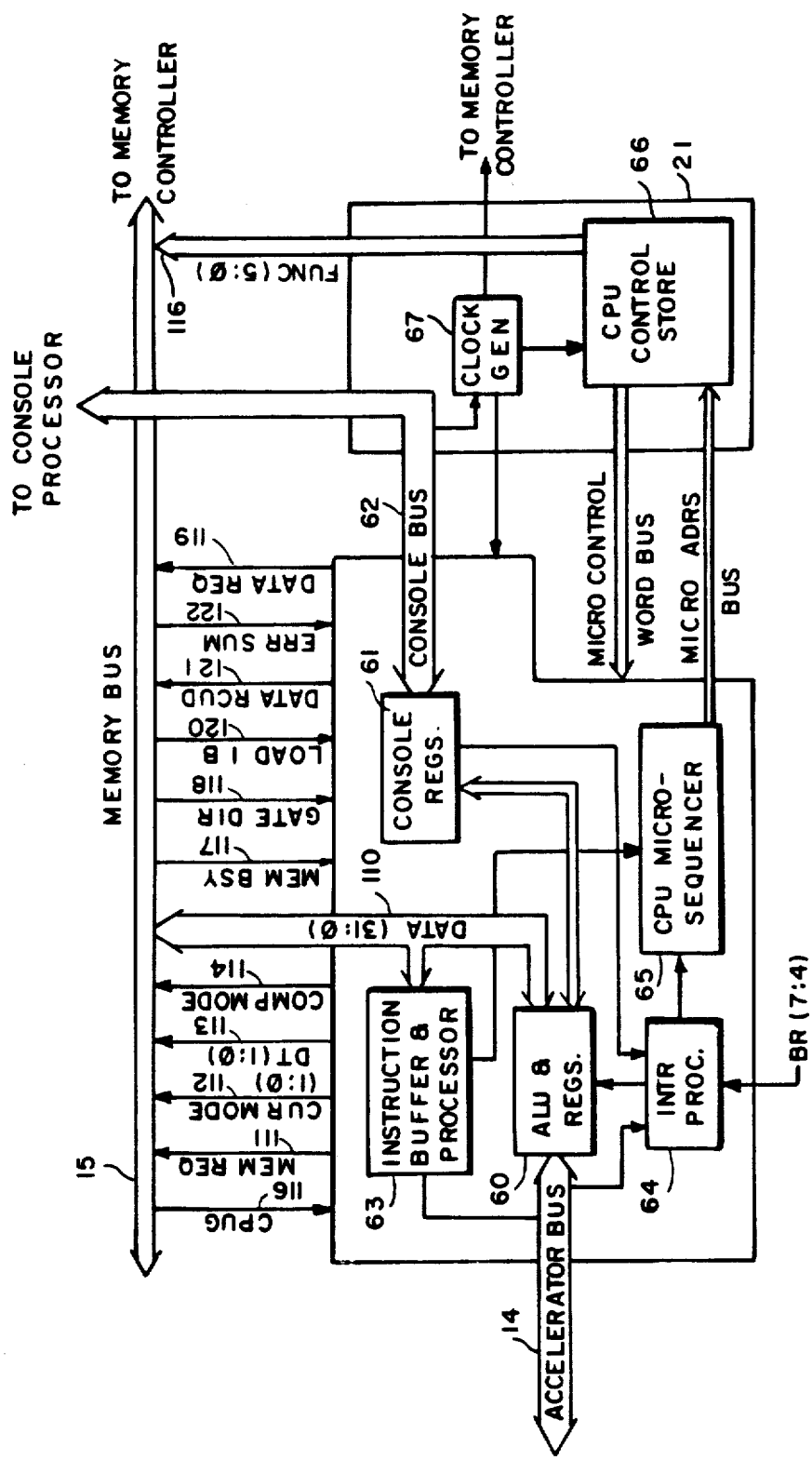
FIG. 2 is a detailed block diagram of a portion of the central processing unit shown in FIG. 1.

FIG. 2 illustrates, in general block diagram form, portions of central processor 10, including data processor 20 and control store 21, that may be useful in the data processing system of FIG. 1.

Data processor 20 includes a data path 60 that includes an arithmatic logic unit and a plurality of general purpose registers (not shown). In one specific embodiment of this invention, one of the general purpose registers is used as a program counter to identify the storage location in memory containing the next instruction to be executed by the processor 10 and another register is used as a stack pointer used during the servicing of interrupts and subroutines, as described in U.S. Pat. No. 3,710,324. The data path 60 receives information from, or transfers information to, the accelerator bus 14, the memory bus 15, or from a plurality of console registers 61 that in turn receive and store information from, or transfer information to, console processor 22 over a console bus 62.

Operations performed by data path 60 are controlled by instructions stored in an instruction buffer 63, which receives each instruction fetched from memory unit 11 identified by the program counter register in data path 60. Alternatively, the operations performed by data path 60 can be controlled by an interrupt processor 64 which receives requests for interrupt service from accelerator bus 14, console bus 62 (through console registers 61) and from the input/output bus 16. The interrupt processor 64 also receives the interrupt priority level at which the processor 10 is then operating and, if the interrupt request has a higher priority level, acknowledges the interrupt and causes the processor 10 to service the interrupt request. A microsequencer 65 generates a microaddress that is used by a control store 66 in control store 21 to access a microinstruction depending on the instructions stored in instruction buffer 63, or the interrupt being serviced by interrupt processor 64. The microsequencer 65 generates the microaddress in response to the particular instruction in instruction buffer 63 then being processed, and the acknowledgement of an interrupt by interrupt processor 64, as well as timing signals generated by a clock generator 67 in control store 21.

C. Floating Point Accelerator 23

Figure 3:
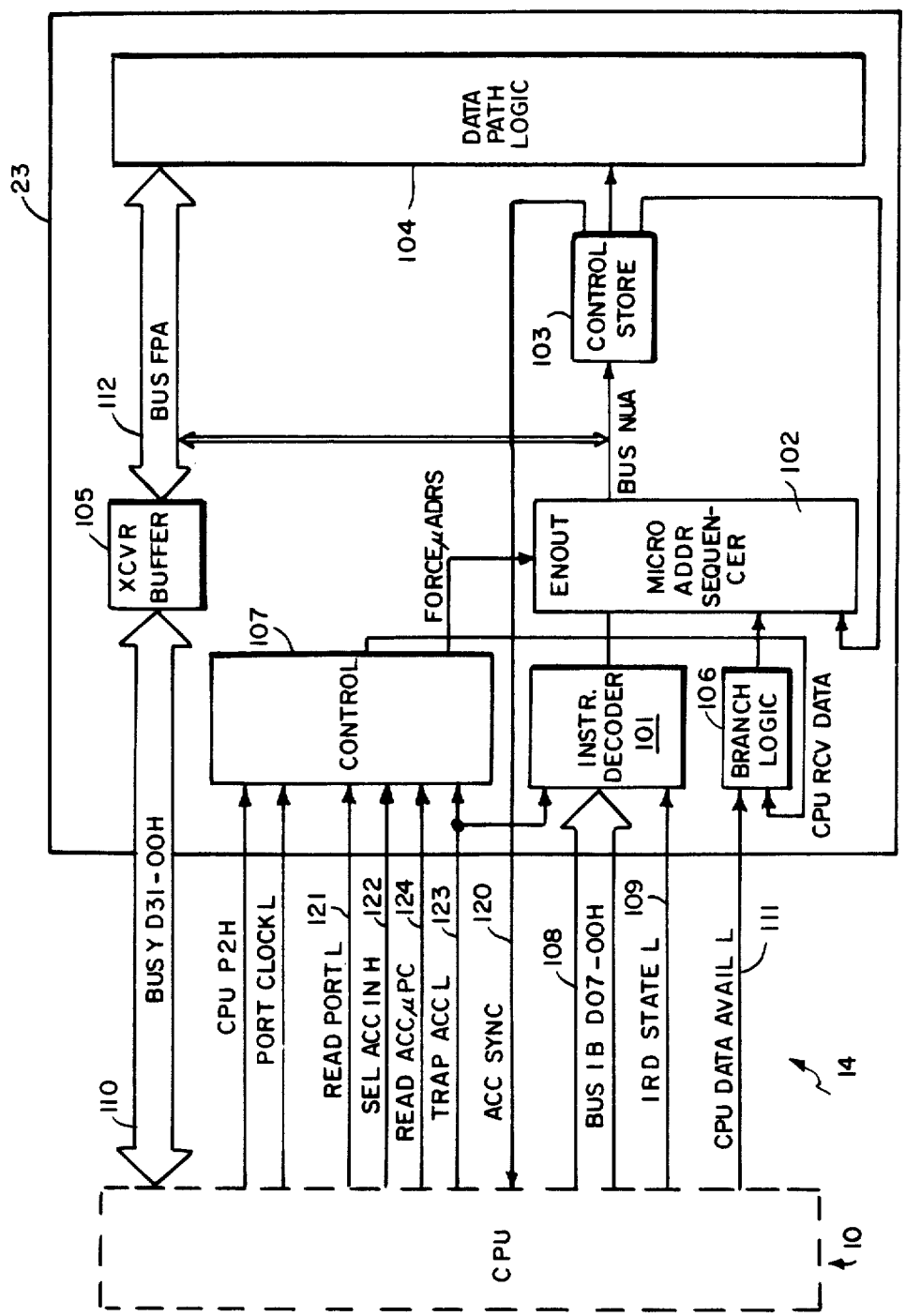
FIG. 3 is a detailed block diagram of a special instruction processing unit shown in FIG. 1, specifically a floating point accelerating unit.

A general block diagram of a floating point accelerator 23 is shown in FIG. 3. A floating point instruction as transferred to the floating point accelerator by the central processing unit 10, specifically by the data path 20, is received in an instruction decoder 101. One specific embodiment of floating point accelerator 23 is microprogrammed. The instruction decoder is thus connected to a microaddress sequencer 102 in a conventional manner, which in turn supplies microaddresses to a control store 103. The control store contains microinstructions that control the operations of floating point accelerator 23, including a data path 104. The data path contains operand storage registers and an arithmetic and logic unit that processes the operands that are received from the central processor unit 10 through a transceiver buffer 105.

The microaddress sequencer 102, using conventional microinstruction addressing techniques, supplies a "next microaddress" to the control store 103. The microaddress sequencer 102 also receives signals from the control store 103 and from a branch logic 106, and generates the next microaddress that is then transmitted to the control store. The control store thus generates microinstructions that control the data path logic 104 based on a predetermined microinstruction sequence. The specific sequence is determined by the instruction from central processor unit 10, as modified by certain conditions in the floating point accelerator 23 as reflected by branch logic 106.

Data path logic 104 also uses conventional data paths to process floating point instructions. The data path contains separate data paths for the exponent and for the mantissa, and operates on each according to the microinstructions from control store 103. In one specific embodiment, the data path logic comprises conventional AMD 2901 bit slice microprocessors sold by Advanced Micro Devices, Inc.

Floating point accelerator 23 also includes interface control circuitry 107 that also receives signals from the central processing unit and assists in synchronizing the transfer of operands and processed data between the central processor unit 10 and floating point accelerator 23. A detailed description of circuitry in control circuitry 107 is presented in FIG. 4.

In accordance with the invention, the central processing unit serially retrieves each instruction from the memory unit 11. Each instruction is loaded into instruction buffer 63 (FIG. 2). The instruction buffer and the associated processor then decode the instruction. If the instruction is a floating point instruction, that is, an instruction that indicates that the operands are in floating point format, it transmits the instruction to the floating point accelerator over the BUS IB D(7:0) 108 (FIG. 3.), simultaneously asserting a synchronizing IRD STATE instruction read signal 109.

The instruction processor 63 (FIG. 2) in central processor unit 10 further decodes the instruction and proceeds to retrieve the operands from the memory unit 11. Each instruction may require one or more operands, and an operand may comprise one or more data words in the memory depending on the required degree of arithmetic precision, each data word requiring a memory retrieval. Each data word is transferred through the ALU 60 (FIG. 2) of the central processor unit 10, and transmitted over BUS Y D(31:00) 110 (FIG. 3), the data section of accelerator bus 14. Each transfer over BUS Y (D31:00) 110 is synchronized to the assertion of a CPU DATA AVAIL CPU data available signal 111.

The floating point accelerator 23 receives each data word, in buffer 105, and transfers it onto a BUS FPA floating point accelerator bus 112. The control store 103 determines into which registers of data path logic 104 each transferred data word is to be stored, depending on whether the word forms part of the mantissa or the exponent. The instruction previously transferred into instruction decoder 101 also identifies the number of operands and the number of data words required to process the instruction. Control store 103 causes the data words to be transferred through buffer 105 and into registers in data path logic 104 in accordance with the number of words to be received. After all the operands have been received, the data path logic 104, under control of control store 103, executes the instruction in a conventional manner.

After the instruction has been executed, the control store 103 transmits an ACC SYNC accelerator synchronization signal over line 120 (FIG. 3) to central processor unit 10. This signal is a signal in the microinstruction generated by control store 103 following execution of each instruction. The central processing unit 10 receives the signal and services it as an interrupt service request. When it is ready to receive the processed data from the floating point accelerator, it asserts a READ PORT signal on a line 121 and a SEL ACC IN select accelerator in signal on line 122. Since several units may be connected to accelerator bus 14, the SEL ACC IN select accelerator in signal serves to enable the floating point accelerator 23 to transmit on the BUS Y D(31:00) 110 and prevents other attached units from transmitting data over those lines. In successive clock cycles, the floating point accelerator 23 transmits the condition codes and data words comprising the processed data from data path logic 104 across BUS FPA 112 through buffer 105 and across BUS Y D(31:00) 110. The central processor unit 10, specifically data path 20, receives the condition codes and data words and transmits them to the memory unit 11.

The arrangement according to the invention provides a much less complex interconnection arrangement between central processor unit 10 and a floating point accelerator 23. The special instruction, in one specific embodiment of a floating point instruction, is transmitted by the central processing unit 10 to floating point accelerator processor 23, and the operands are then automatically and sequentially retrieved by data processor 20 and transmitted directly to floating point accelerator 23 with no further interaction between them. When the condition codes and processed data are ready, the floating point accelerator signals the central processing unit. When the central processing unit is ready to receive the processed data, it signals the floating point accelerator, which reponds with successive data words in sucessive clock cycles. Both the central processor unit and floating point accelerator determine the number of data words to be transferred in both directions, as operands and processed data, based on the contents of the instructions. Therefore, the only communication back and forth as to the number of data words to be transferred is by way of the instruction. This simplifies the floating point accelerator and the communications therebetween.

The central processing unit 10 and floating point accelerator also provide maintenance and diagnostic features in which the central processor unit 10 may transmit a "next microaddress" to the floating point accelerator control store 103 to place the control store in a specific and known address condition. Furthermore, the central processor unit may read, or retrieve, the "next microaddress" that is supplied by microaddress sequencer 102 to control store 103.

The operation by which the central processor unit forces the control store 103 to a known address condition will be described in connection with FIG. 3. The central processor unit transmits a microaddress over BUS Y D(31:00) 110, and asserts a TRAP ACC trap accelerator signal on line 123. The TRAP ACC trap accelerator signal is received in control circuitry 107, which inhibits the microaddress sequencer 102 from transmitting a next microaddress onto the control store, and enables the signals on the BUS Y D(31:00) to be transmitted through buffer 105 and to the "next microaddress" input to control store 103. The control store 103 then transmits the microinstruction identified by the supplied signals, forcing a shift to the sequence defined by the address transmitted on BUS Y (D31:00) 110.

The operation in which the central processor unit 10 retrieves the microaddress transmitted by microaddress sequencer 102 will be explained in connection with FIG. 3. The central processor unit first transmits a READ ACC UPC read accelerator microprogram counter signal on line 124 to control circuitry 107. This conditions the floating point accelerator 23 to transfer the next microaddress generated by microaddress sequencer 102 to transceiver 132 in buffer 105. During the next succeeding clock cycle, the central processor unit asserts the READ PORT signal on line 121. At that time, the "next microaddress" is transmitted through buffer 105 onto BUS Y D(31:00) in synchronism with the control store's assertion of the ACC SYNC accelerator sync signal on line 120 from control store 103. At the end of the clock cycle, the "next microaddress" is removed from the BUS Y D(31:00) 110 and the floating point accelerator 23 returns to normal operation.

Figure 4:
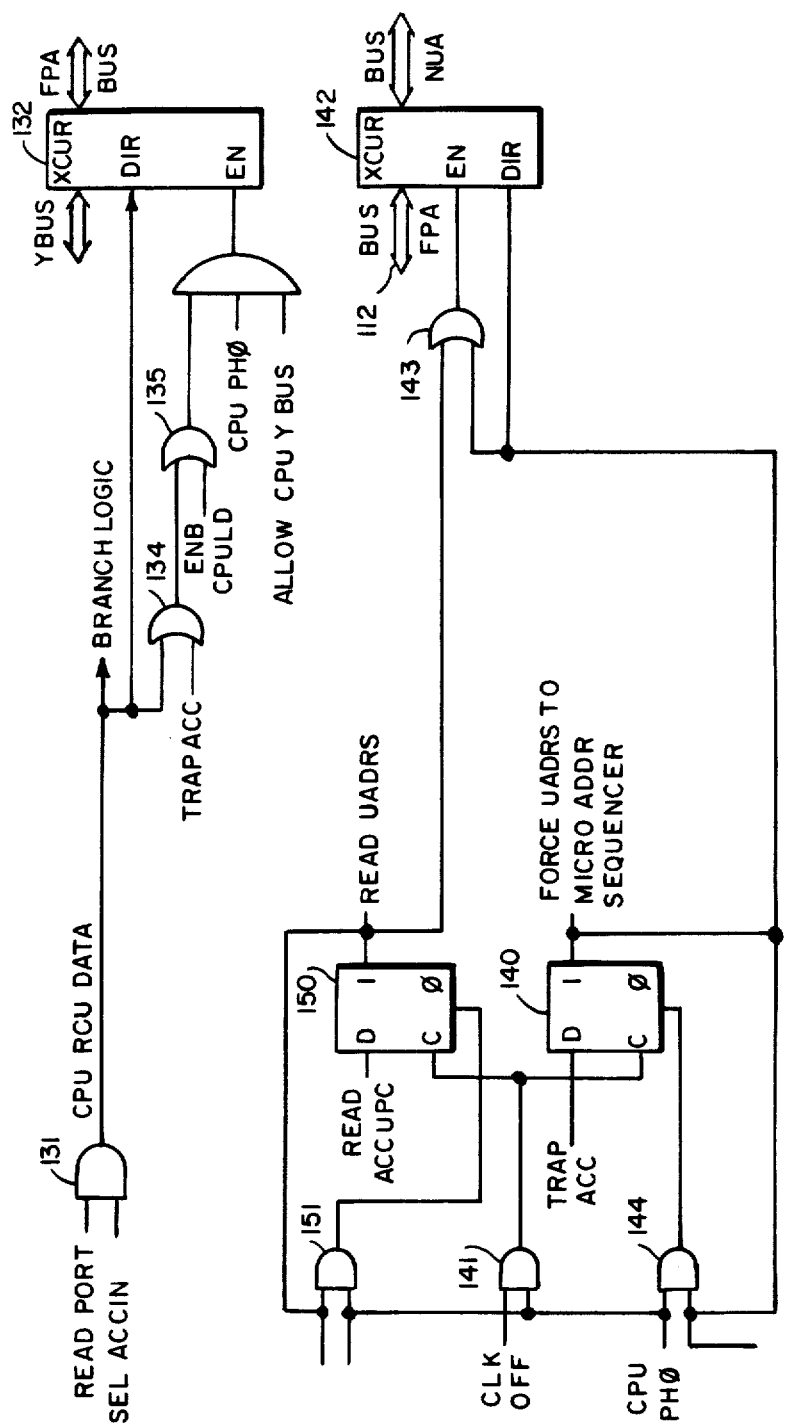
FIG. 4 depicts a detailed circuitry in a portion of the control block shown in FIG. 3.

FIG. 4 depicts certain circuitry in control 107 that enables the floating point accelerator 23 to receive the READ PORT, SEL ACC IN select accelerator in signal, READ ACC UPC read accelerator microprogram counter signal, and TRAP ACC trap accelerator signal and enables it to transmit and receive the associated signals over BUS Y D(31:00).

The READ PORT and SEL ACC IN select accelerator in signals are received in the control circuit 107 and coupled to an AND gate 131. The coincidence of these signals causes the assertion of an CPU RCV DATA central processing unit receive data signal which is coupled to branch logic 106. The branch logic enables the microaddress sequencer 102 to shift control store 103 to a sequence that causes the floating point accelerator 23 to transmit processed data and the condition codes to central processor unit 10. This signal also conditions a transceiver 132 in buffer 105 between BUS FPA 112 and BUS Y D(31:00) 110 to transmit data from floating point accelerator 23 to central processor unit 10.

The CPU RCV DATA central processing unit receive data signal also energizes OR gates 134, 135 and one input to AND gate 136, which is also energized by a CPU PH0 clocking signal from central processor unit 10, and an ALLOW CPU Y BUS signal from control store 103 to enable transceiver 132.

When the TRAP ACC trap accelerator signal is asserted, neither the READ PORT nor the SEL ACC IN select accelerator in signals are asserted. Therefore, the CPU RCV DATA central processor unit receive data signal is not asserted. Transceiver 132 is thus conditioned to transfer signals from BUS Y D(31:00) 110 to BUS FPA 112 through buffer 105. The transceiver is enabled by the TRAP ACC trap accelerator signal through OR gates 134 and 135, and AND gate 136 when the CPU PH0 timing signal and ALLOW CPU Y BUS signal from control store 103 are asserted.

The TRAP ACC trap accelerator signal also causes a flip-flop 140 to be set through AND gate 141 at the coincidence of the CPU PH0 and CLK OFF timing signals. The setting of flip-flop 140 causes a FORCE UADRS force microaddress signal to be asserted. As shown in FIG. 3, this signal is transmitted from control 107 to microaddress sequencer 102. When the FORCE UADRS force microaddress signal is asserted, the address from microaddress sequencer 102 is not transmitted to control store 103. The FORCE UADRS force microaddress signal enables a transceiver 142 to transfer a next microaddress from the BUS FPA 112 to control store 103. The transceivers 141 are enabled through an OR gate 143. The flip-flop 140 is reset at the assertion of the next CPU PH0 timing signal but through an AND gate 144.

The control 107 receives the READ ACC UPC read accelerator microprogram counter signal in a flip-flop 150, which generates a READ UADRS read microaddress signal. This READ UADRS read microaddress signal is coupled through OR gate 143 to enable transceiver 142. However, since the FORCE UADRS force in microaddress signal is not asserted, the transceiver 142 is conditioned to transmit the next microaddress signal from microaddress sequencer 102 onto BUS FPA 112.

The flip-flop 150 is then reset through AND gate 151 at the next CPU PH0 clocking signal.

FIG. 5 depicts detailed sequences of the operations of transferring instructions, operands, and processed data, as well as microaddresses, between CPU 10 and floating point accelerator 23. The sequences depicted in FIG. 5 are self-explanatory and a detailed description of these operations is not required here for an understanding of the invention.

The foregoing description is limited to a specific embodiment of this invention. It will be apparent, however, that this invention can be practiced in systems having diverse basic construction or in systems that use different internal circuitry than is described in this specification with the attainment of some or all of the foregoing objects and advantages of this invention. It is the object of the appended claims to cover all such variations and modifications as come within the true spirit and scope of this invention.

What is claimed as new and desired to be secured by Letters Patent of the United States is:

1. A special instruction processor for processing a predetermined class of instructions on a predetermined class of operands each containing a predetermined number of data words, the special instruction processor for connection to bus that also connects to a central processing unit that retrieves instructions and operands from, and transmits results of processing to, a memory, the instructions in said predetermined class each containing an operation code identifying the operation to be performed and the number of operands required to process the instruction, the bus including lines for transferring instruction operation codes, data words and control signals including timing signals defining successive bus cycles between the central processing unit and the special instruction processor, the special instruction processor comprising:

A. means arranged to be connected to the instruction operation code and control lines of the bus for receiving instructions of said predetermined class transmitted from the central processing unit and for decoding the instructions to determine the number of data words required to be received in order to process the operand;

B. means connected to said decoding means and arranged to be connected to the data and control lines of the bus for iteratively receiving data words over the data lines in successive bus cycles, the number of data words received being determined by said decoding means;

C. means connected to said decoding means and said receiving means and arranged to be connected to the control lines of the bus for processing the operands in accordance with the operation defined in the operation code and for transmitting a control signal to the central processing unit when the processing has been completed; and D. means connected to said decoding means and arranged to be connected to the data and control lines of the bus for transmitting the results of processing to the central processing unit over the data lines in successive bus cycles in response to a control signal from the central processing unit.

2. A special instruction processor as defined in claim 1 wherein the central processing unit transmits an instruction operation code over the instruction operation code lines of the bus and an instruction read enabling signal over a control line of the bus when the instruction is one of the predetermined class of instructions, said decoding means comprising means arranged to be connected to the instruction operation code lines and the instruction read enabling signal line for receiving and decoding the instruction operation code in response to the receipt of said instruction read enabling signal.

3. A special instruction processor as defined in claim 1, the central processing unit including means for transmitting data words over the data lines of the bus and a data available signal over the control lines of the bus when it is transmitting the data words, said receiving means comprising:
   A. buffer means arranged to be connected to the data lines of the bus for receiving data words over the data lines; and
   B. transfer control means connected to said decoding means and said buffer means and arranged to be connected to the data and control lines of the bus for enabling, in response to the data available signal, said buffer means to iteratively receive data words from the data lines during successive bus cycles.

4. A special instruction processor as defined in claim 1, the central processing unit includes means for receiving data words from the data lines of the bus and means for transmitting a read enabling signal over a control line of the bus, wherein said transmitting means includes:
   A. buffer means arranged to be connected to the data lines of the bus for transmitting data words over the data lines; and
   B. transfer control means connected to said decoding means and said buffer means arranged to be connected to the data and control lines of the bus for enabling, in response to the read enabling signal, said buffer means to iteratively transmit data words from the data lines during successive bus cycles.

5. A special instruction processor as defined in claim 4 wherein a plurality of units can be connected to the bus and the central processing unit includes means for transmitting a selection signal over a control line in the bus, said transfer control means enabling said buffer means to transmit in response to the receipt of a selection signal from the bus identifying the special instruction processor.

6. A special instruction processor as defined in claim 1 wherein said processing means processes each instruction in a series of states each identified by a state address, the central processing unit including means for transmitting a state address over the data lines and a trap signal over the control lines of the bus, said special instruction processor further including:
   A. buffer means arranged to be connected to the data lines of the bus for receiving and storing the state address received from the data lines;
   B. means connected to said buffer means and to said processing means for transferring the contents of the buffer means to said processing means to force said processing means to a state identified by the state address; and
   C. control means connected to said buffer means and said transfer means and arranged to be connected to the control lines of the bus for enabling said buffer means to receive the state address from the data lines and said transfer means to transfer the state address from said buffer means to said processing means in response to the receipt of a trap signal from the control lines.

7. A special instruction processor as defined in claim 1 wherein said processing means processes each instruction in a series of states each identified by a state address, the central processing unit including means for receiving a state address over the data lines and a read signal over the control lines of the bus, said special instruction processor further including:
   A. buffer means arranged to be connected to the data lines of the bus for storing data signals and transmitting them over the data lines;
   B. means connected to said buffer means and to said processing means for transferring the state address from said processing means for storage in said buffer means; and
   C. control means connected to said buffer means and said transfer means and arranged to be connected to the control lines of the bus for enabling said transfer means to transfer the state address from said processing means to said buffer means and for enabling said buffer means to transmit the state address over the data lines in response to the receipt of a read signal from the control lines.

* * * * *